UNITED STATES PATENT OFFICE.

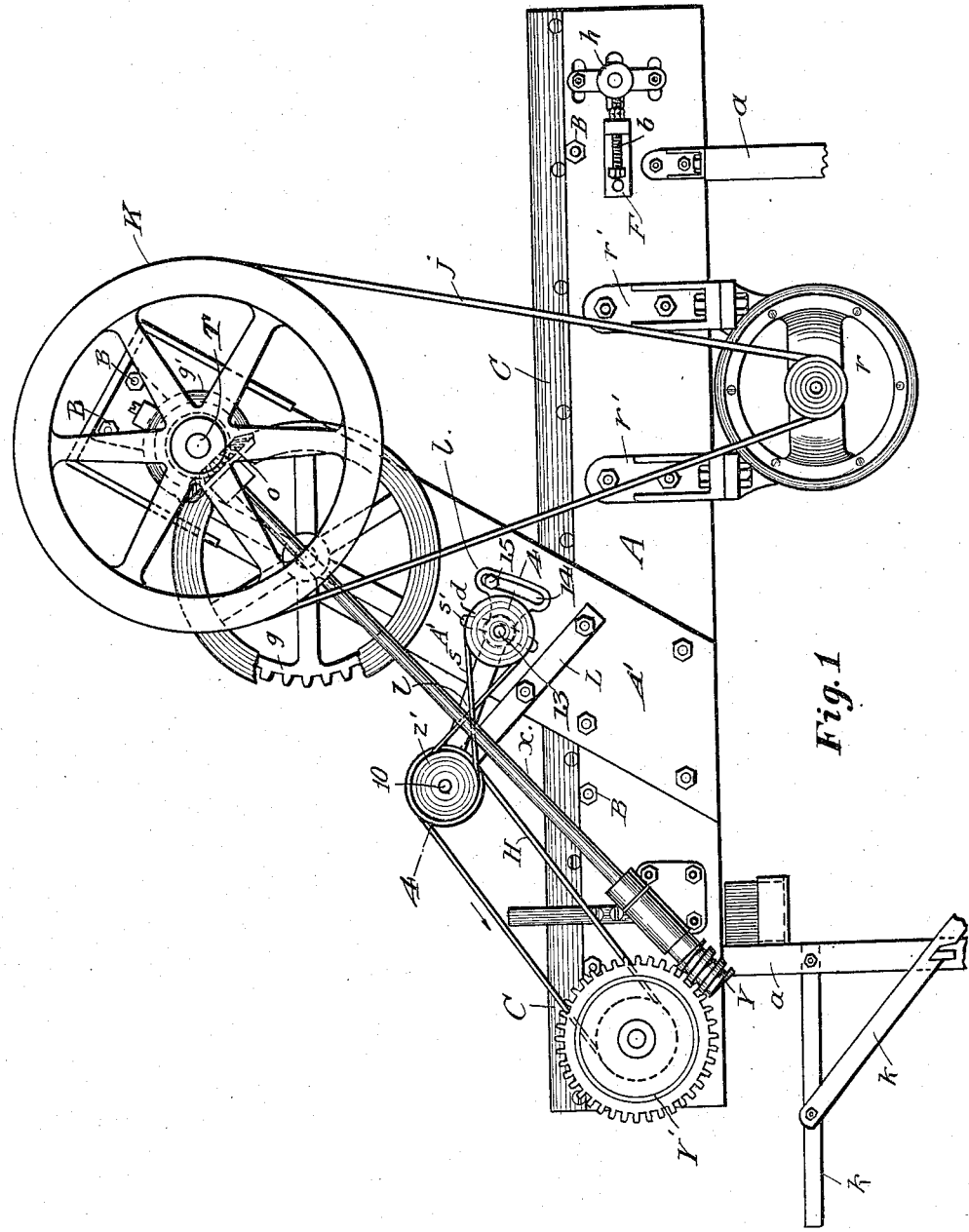

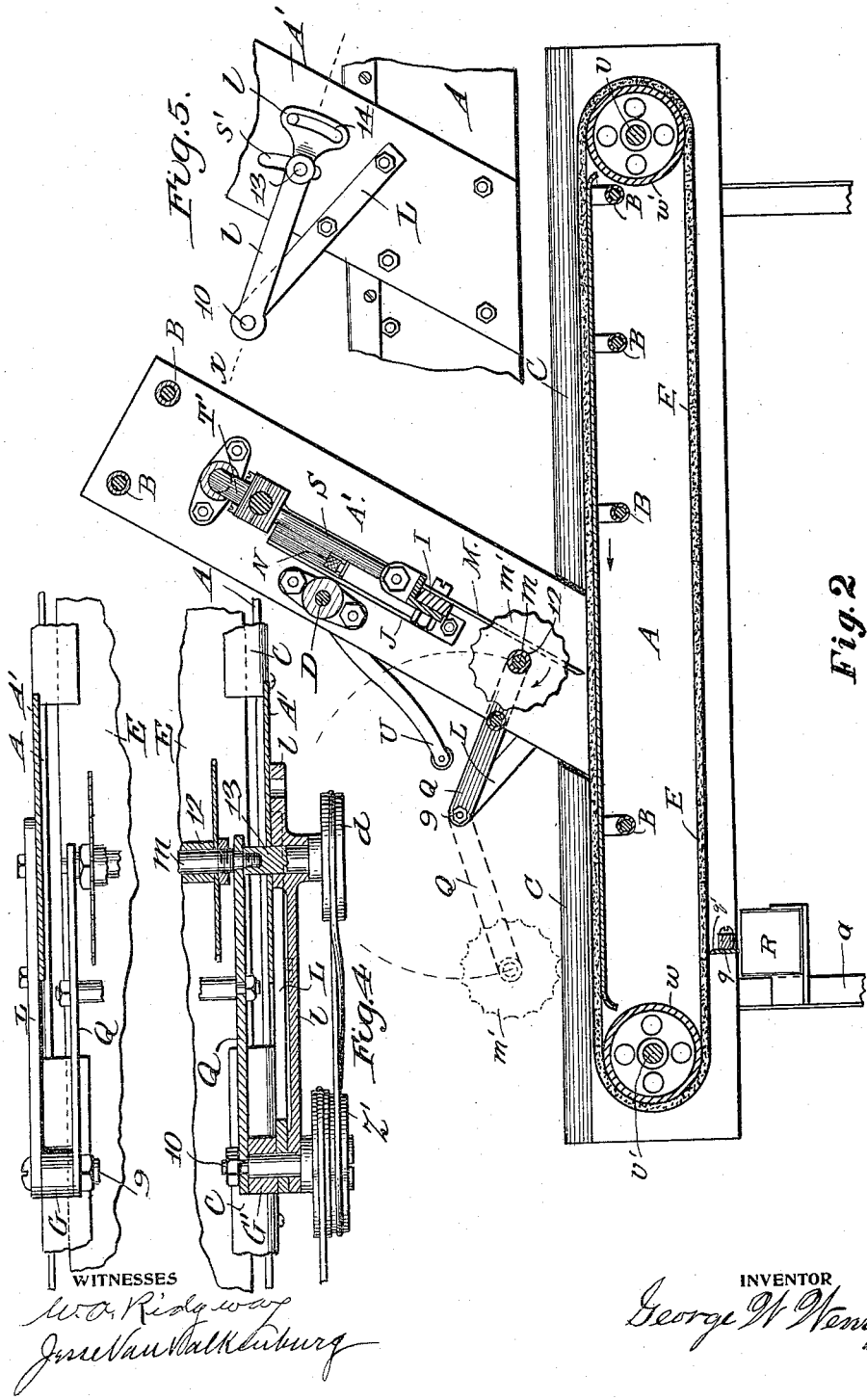

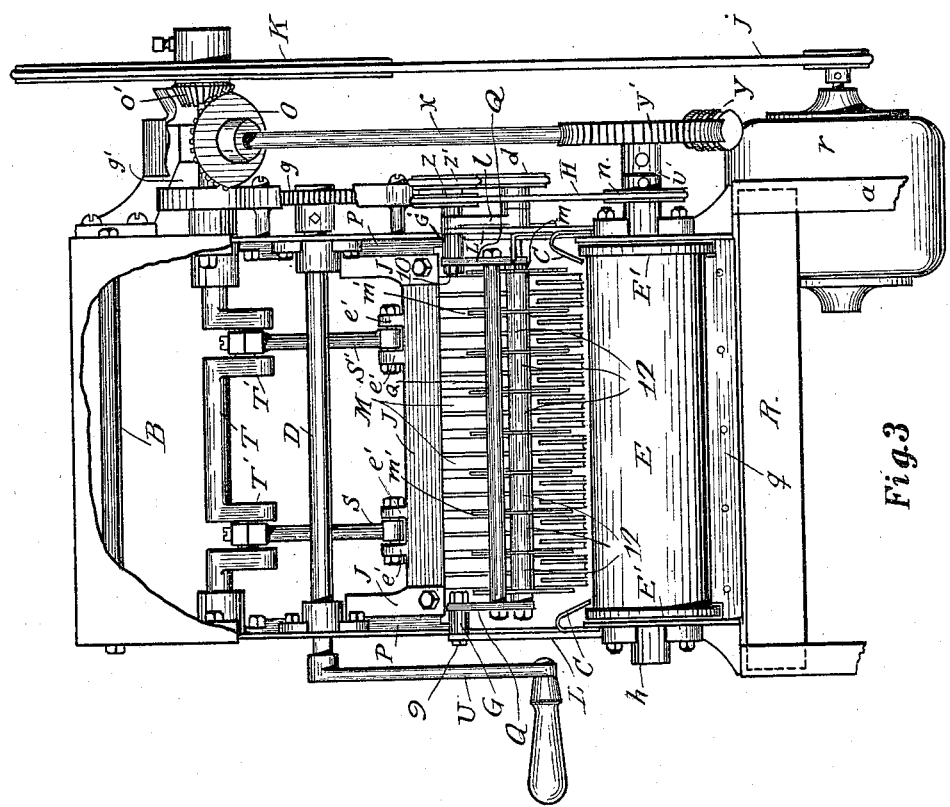

GEORGE W. WEMPLE, OF MINNEAPOLIS, MINNESOTA.

BEEFSTEAK-DEFIBERIZING MACHINE.

1,165,217.   Specification of Letters Patent.   Patented Dec. 21, 1915.

Application filed March 13, 1913. Serial No. 754,123.

*To all whom it may concern:*

Be it known that I, GEORGE W. WEMPLE, being a citizen of the United States, residing at Minneapolis, in the county of Hennepin and State of Minnesota, have invented a new and useful Beefsteak-Defiberizing Machine, of which the following is a specification.

My invention relates to improvements in beefsteak defiberizing machines in which a series or number of chisel, or sickle-edged, and bifurcated needle blades reciprocate vertically above a revolving belt, which carries the beefsteak or slice of meat to be tendered by means of the needle thrusts at uniform spaces. The revolving belt coöperates with a series of scalloped edged disks revolving in unison above and with the belt for the purpose of holding the meat down upon the belt, said disks acting as a force feed and upper roll, which helps to carry or draw the meat under the reciprocating needle blades while the machine is in operation. The needles sever the muscle fibers while passing nearly through the slice, making slit-like incisions close together, yet leaving thin uncut walls sufficient to hold the mass practically in the original slice form. I attain these objects by the mechanism illustrated in the accompanying drawings, in which—

Figure 1 is a side view of a vertical section of the entire machine; Fig. 2, is a side view of a vertical section showing the needle blades in full descent with relation to the carrying belt and the position of the stripper disks while in working position, and again as swung up, out back, for the purpose of facilitating the work of cleaning the needles. Fig. 3 is a front elevation of the machine showing nearly all the parts in their several relations. Fig. 4 is a fragmentary part sectional view substantially on line 4—4 of Fig. 1. Fig. 5 is a side elevation detail of the swinging arm 1, and the supporting means therefor.

Similar letters refer to similar parts throughout the several views.

The framework of my machine constitutes side plates A A, together with protector strips C C, and upright members A′ A′, secured by tie-bolts B B, and resting upon feet $a$ $a$.

A driving shaft D journaled in the frame members A′ bolted on the side plates A has thereon a crank U at one end and a gear $g$ at the other, the spur gear $g$ meshing with a pinion $g'$ on a crank shaft T. To the cranks T′ are connected pitmen S S′ which are pivotally connected to ears $e'$ on a crosshead J mounted to reciprocate in guides P attached to the frame members A′. The end bearings of the crosshead J are provided with oil cups N (see Fig. 2). The crosshead J has secured thereto a slotted crosshead bar I to which are bolted so as to be spaced an eighth of an inch apart a series of needle blades M which are preferably one-half inch wide with a slot one-eighth inch wide part way up from the lower end. The lower ends of each of these portions of the knife are preferably formed with a curved chisel edge drawn to a needle-like point at each side. The crank shaft T has thereon a bevel wheel O′ meshing with a bevel wheel O on the end of a worm shaft $x$ journaled in bearings on the side of the frame. Said worm shaft has thereon a worm Y meshing with a worm wheel Y′ on a shaft V′ journaled between side frame members A at the forward end thereof. A similar shaft V is journaled between side frame members A at the rear thereof. Upon shaft V′ is a roller $w$ and upon shaft V is a similar roller $w'$, said rollers being provided with side flanges E′, and over these rollers and between the flanges runs an endless belt E. The upper run of the belt E passes over and is supported by a table secured to the tie-bolts B, as clearly shown in Fig. 2. The crank shaft T also may be provided with a pulley K connected by a belt $j$ with the pulley of a motor $r$ by which the machine may be driven instead of by the hand crank U, said motor being attached to the frame members A by means of the brackets $r'$.

The above described mechanism when operated will have the effect of reciprocating the crosshead J and the defiberizer blades or knives carried thereby to a point short of but close to the upper surface of belt E, as indicated in Fig. 3, and at the same time will, through worm Y and worm wheel Y′ drive the endless belt E in a forward direction. Meat such as beefsteak laid upon the endless belt E will thereby be brought beneath the reciprocating knives M and slowly moved under the same as the knives progressively enter the body of the meat, and the chisel edges and points thereon will cut the fibers of the meat so as to render the same tender and easily masticated when cooked. As fast as one piece of meat has passed the knives a fresh piece may be laid upon endless belt E and the operation be kept practically continuous as long as desired, the defiberized meat falling into a receptacle which may be supported by a bracket k k, preferably hinged to support a to permit the bracket k k to drop down out of the way when the machine is not in use. A scraper blade q is secured between frame members A so that the upper edge q' thereof will engage the surface of the lower run of belt E and scrape off fat and other refuse from the belt, which refuse may fall and drop into a pan R. The shaft V for rear roller w' is carried by bearing blocks h adjustable by a set screw b threaded into a bracket F. Projector strips C are secured to the side plates A and extend inwardly over the edges of carrier belt E to hold the meat in position on the belt and keep the edges of the belt clean.

Arms L are bolted to the frame members A' and pivotally secured to the ends of these arms by means of stud bolts 9 and 10, and spacing sleeves or collars G G', are a pair of arms Q having journaled in the ends thereof a shaft m on which are a series of stripper disks m' spaced apart by short tubes 12. As shown in Fig. 3, a pulley n on the shaft V' is connected by belt H with a pulley Z on the stud bolt 10 which extends outwardly from the end of the arm L. A grooved pulley Z' is on the same hub with pulley Z and drives through a belt s, a pulley d upon a shaft 13 extending through a box carried by an arm l pivotally supported from the end of arm L outside of the same and provided with an arcuate slot 14 through which a set-screw 15 passes into frame standard A', as clearly shown in Fig. 1. The shaft 13 of pulley d extends through slot s' in frame member A' and is adapted to be removably secured to the stripper shaft m to turn same when desired. By turning slotted arm l, the disks m' are adjusted to different thicknesses of meat.

It is noted that the endless belt or carrier apron E is waterproof, and may, if desired, have raised edges or edges formed of double thickness of material. The knives M reciprocate between the stripper disks m', and the stripper disks, which have serrated edges, as shown, are positively driven so as to have a peripheral speed adjacent the apron E equal to the rate of travel of said apron. Thus the stripper disks hold down and compact the meat at the point where the meat is acted upon by the edges of the knives or plates M, thus insuring a defiberizing or fiber cutting action of the highest efficiency,

I claim:

1. A meat defiberizing machine comprising a movable carrier, reciprocating needle blades engageable in meat upon said carrier, means simultaneously to move the carrier and reciprocate the blades so as to subject material upon the carrier progressively to the puncturing action of the blades, and a plurality of stripper disks engageable with meat on the carrier at the point where the same is acted upon by the blades.

2. A meat defiberizing machine comprising a movable carrier, reciprocating needle blades engageable in meat upon said carrier, means simultaneously to move the carrier and reciprocate the blades so as to subject material upon the carrier progressively to the puncturing action of the blades, a plurality of rotatable stripper disks between adjacent pairs of knives engageable with material upon the meat at the point where the same is acted upon by the blades, and means to rotate the stripper disks so as to give the same a peripheral speed in the same direction as and at the same rate as the travel of the carrier.

3. A meat defiberizing machine comprising a movable carrier, reciprocating needle blades engageable in meat upon said carrier, means simultaneously to move the carrier and reciprocate the blades so as to subject material upon the carrier progressively to the puncturing action of the blades, a plurality of rotatable scalloped stripper disks each operating between adjacent pairs of blades and engageable with meat on the carrier at the point where said material is operated upon by the blades, and means to rotate the stripper disks.

4. A meat defiberizing machine comprising a movable carrier, reciprocating needle blades engageable in meat upon said carrier, means simultaneously to move the carrier and reciprocate the blades so as to subject material upon the carrier progressively to the puncturing action of the blades, a plurality of rotatable scalloped stripper disks each operating between adjacent pairs of blades and engageable with meat on the carrier at the point where the meat is operated upon by the blades, means to rotate the stripper disks, and means to disconnect said stripper disks from the rotating means and to permit withdrawal of the same from operative position.

In testimony whereof, I have signed my name to this specification in the presence of two subscribing witnesses on this sixth day of March, 1913.

GEORGE W. WEMPLE. [L. S.]

Witnesses:
W. A. RIDGEWAY,
JESSE VAN VALKENBURG.

Copies of this patent may be obtained for five cents each, by addressing the "Commissioner of Patents, Washington, D. C."